(12) United States Patent
Schill et al.

(10) Patent No.: US 11,054,551 B2
(45) Date of Patent: Jul. 6, 2021

(54) MULTIPLE IMAGE SCATTERING DEVICE

(71) Applicant: ROLIC AG, Zug (CH)

(72) Inventors: Benoit Schill, Bouxwiller (FR);
Etienne Berner, Muenchenstein (CH);
Reto Genini, Basel (CH); Julien Martz, Mulhouse (FR)

(73) Assignee: ROLIC AG, Zug (CH)

( * ) Notice: Subject to any disclaimer, the term of this patent is extended or adjusted under 35 U.S.C. 154(b) by 304 days.

(21) Appl. No.: 15/566,369

(22) PCT Filed: Apr. 11, 2016

(86) PCT No.: PCT/EP2016/057880
§ 371 (c)(1),
(2) Date: Oct. 13, 2017

(87) PCT Pub. No.: WO2016/166044
PCT Pub. Date: Oct. 20, 2016

(65) Prior Publication Data
US 2018/0106932 A1 Apr. 19, 2018

(30) Foreign Application Priority Data
Apr. 16, 2015 (EP) .................................... 15163785

(51) Int. Cl.
*G02B 5/02* (2006.01)
*B42D 25/29* (2014.01)
(Continued)

(52) U.S. Cl.
CPC .......... *G02B 5/0257* (2013.01); *B42D 25/29* (2014.10); *B42D 25/324* (2014.10);
(Continued)

(58) Field of Classification Search
CPC .. G02B 5/0257; G02B 5/0221; G02B 5/0263; G02B 5/0284; G02B 5/02; G02B 5/00;
(Continued)

(56) References Cited

U.S. PATENT DOCUMENTS

2007/0196616 A1* 8/2007 Stalder ................. G02B 5/0257
428/64.1
2012/0127547 A1* 5/2012 Gocho ................. B42D 25/324
359/2
(Continued)

FOREIGN PATENT DOCUMENTS

DE   10 2006 012 732 A1   9/2007
DE   10 2012 105 571 A1   1/2014
(Continued)

OTHER PUBLICATIONS

International Search Report for PCT/EP2016/057880 dated Jul. 15, 2016 [PCT/ISA/210].
(Continued)

*Primary Examiner* — Stephone B Allen
*Assistant Examiner* — Jyotsna V Dabbi
(74) *Attorney, Agent, or Firm* — Sughrue Mion, PLLC

(57) ABSTRACT

An optical element where a first and a second image is at least partially encoded by a pattern of a non-periodic, anisotropic surface relief microstructure such that when light is incident on the surface of the element the first image is optimally visible under a first viewing angle and the second image is optimally visible under a second viewing angle. The optical element is particularly useful for securing documents and articles against counterfeiting and falsification.

21 Claims, 11 Drawing Sheets

(51) Int. Cl.
*B42D 25/425* (2014.01)
*B42D 25/324* (2014.01)
*B42D 25/24* (2014.01)
*B42D 25/328* (2014.01)
*B42D 25/435* (2014.01)

(52) U.S. Cl.
CPC ......... *B42D 25/425* (2014.10); *G02B 5/0221* (2013.01); *G02B 5/0263* (2013.01); *G02B 5/0284* (2013.01); *B42D 25/24* (2014.10); *B42D 25/328* (2014.10); *B42D 25/435* (2014.10)

(58) Field of Classification Search
CPC .... G02B 5/0278; G02B 5/0215; G02B 5/021; G02B 5/0205; G02B 27/10; G02B 27/12; G02B 27/14; B42D 25/29; B42D 25/324; B42D 25/425; B42D 25/24; B42D 25/328; B42D 25/435; B42D 25/00; B42D 25/23–385; B42D 25/30–324; B42D 25/355; B42D 25/36; B42D 2033/10; B42D 2033/18; B42D 2033/24; B42D 2035/02; B42D 2035/08; B42D 2035/12; B42D 2035/20; B42D 2035/34; B42D 2035/50
USPC ................. 359/599, 601, 622, 626, 619, 627
See application file for complete search history.

(56) References Cited

U.S. PATENT DOCUMENTS

| | | | | |
|---|---|---|---|---|
| 2012/0268598 A1* | 10/2012 | Holmes | .................. | B42D 25/21 348/143 |
| 2012/0274998 A1* | 11/2012 | Holmes | .................. | B42D 25/29 359/2 |
| 2013/0154251 A1* | 6/2013 | Jolic | .................... | G02B 5/1809 283/85 |
| 2013/0338817 A1 | 12/2013 | Schrunk | | |
| 2014/0191500 A1 | 7/2014 | Holmes | | |
| 2014/0367957 A1 | 12/2014 | Jordan | | |
| 2015/0192897 A1 | 7/2015 | Schilling et al. | | |

FOREIGN PATENT DOCUMENTS

| | | |
|---|---|---|
| EP | 2 682 933 A1 | 1/2014 |
| JP | 2002-328639 A | 11/2002 |
| JP | 2008-107472 A | 5/2008 |
| JP | 2011-145319 A | 7/2011 |
| JP | 2013020239 A | 1/2013 |
| JP | 2014-519424 A | 8/2014 |
| WO | 01/029148 A1 | 4/2001 |
| WO | 2006/007742 A1 | 1/2006 |
| WO | 2007/131375 A1 | 11/2007 |
| WO | 2008/095706 A1 | 8/2008 |
| WO | 2010/094441 A1 | 8/2010 |
| WO | 2012/143426 A1 | 10/2012 |

OTHER PUBLICATIONS

Written Opinion for PCT/EP2016/057880 dated Jul. 15, 2016 [PCT/ISA/237].

Communication dated Jan. 5, 2021 from the Japanese Patent Office in Application No. 2017-553890.

* cited by examiner

Fig. 1.1
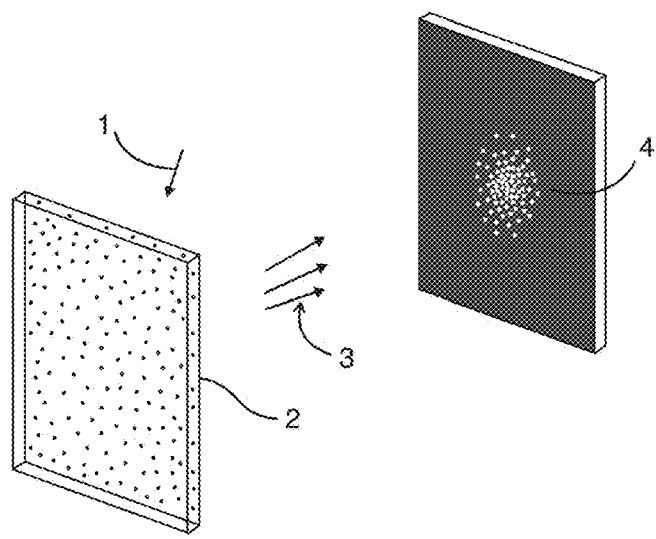
Fig. 1.2
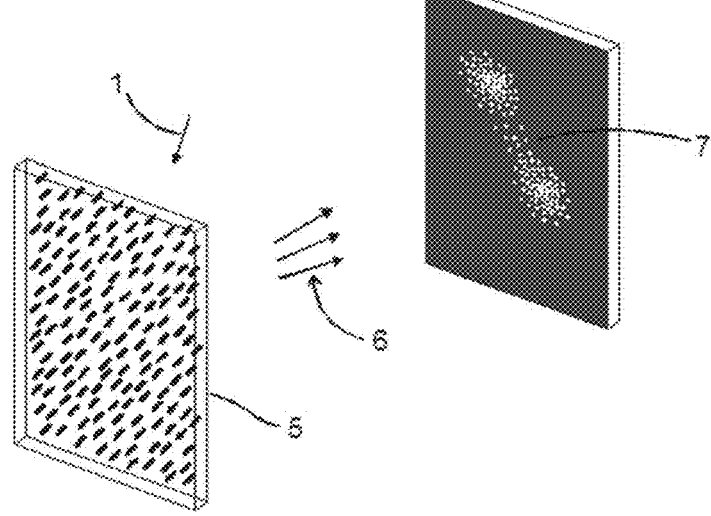
Fig. 2
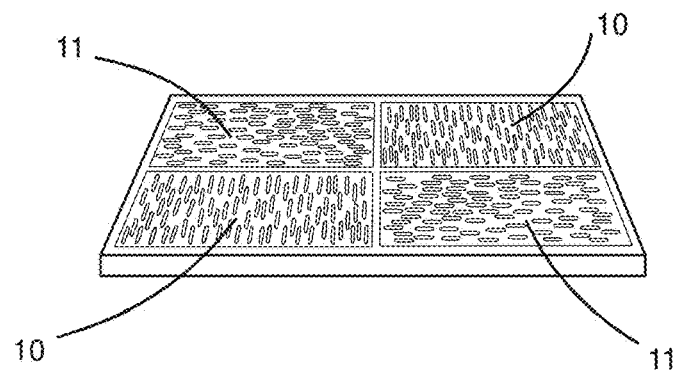

Fig. 3.1
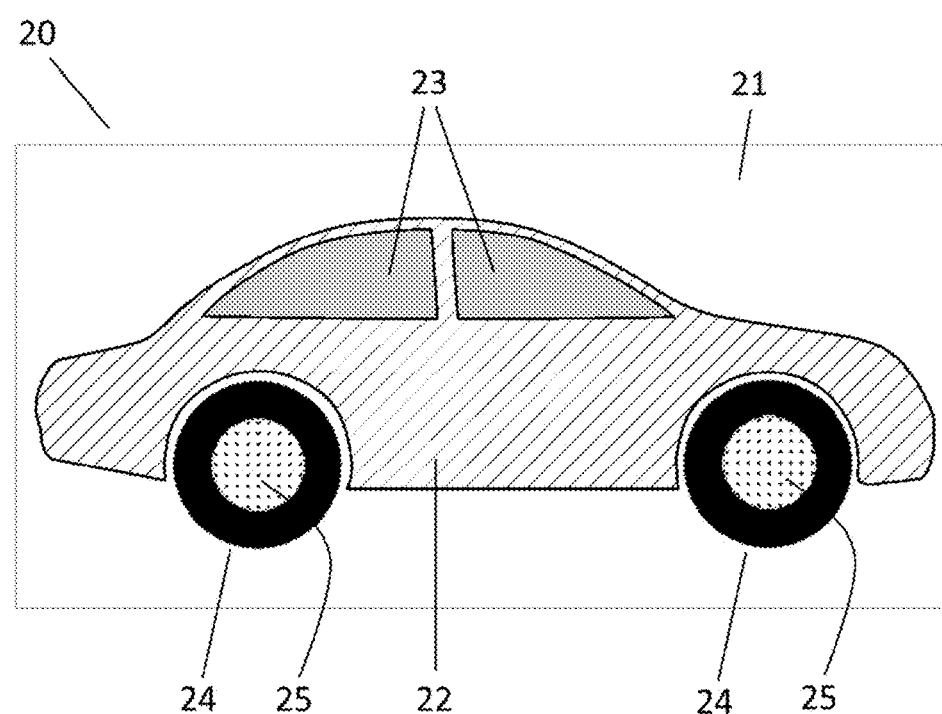
Fig. 3.2
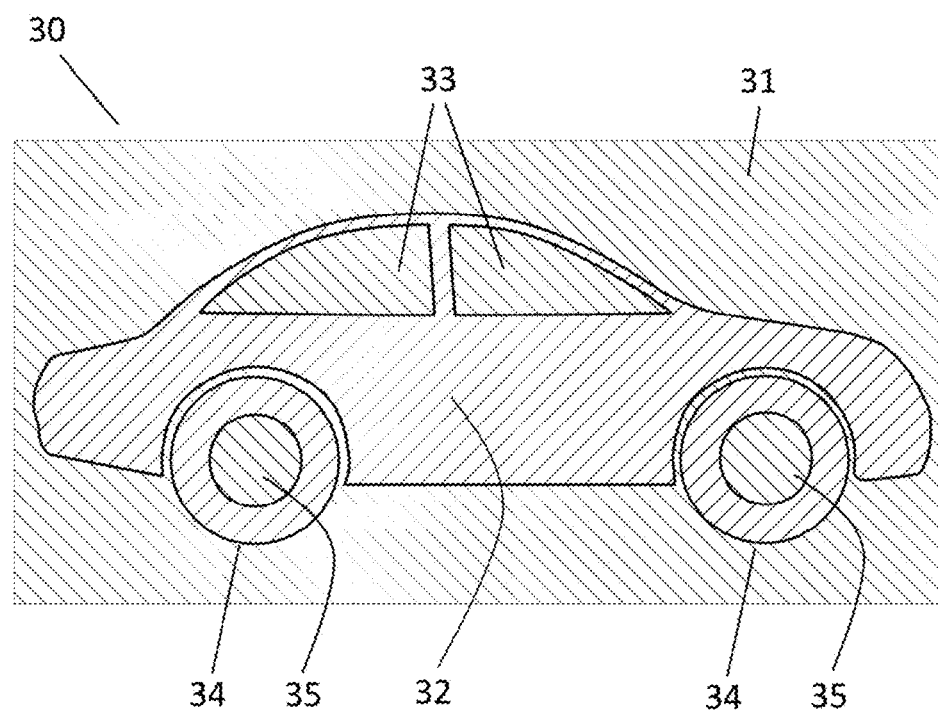

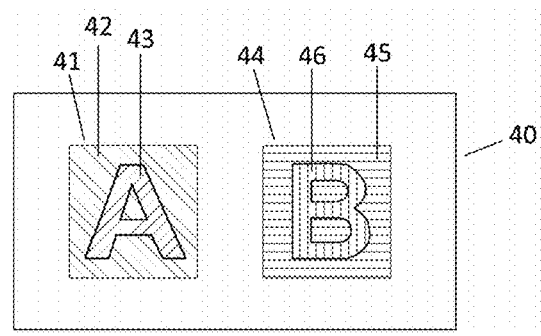
Fig. 4.1
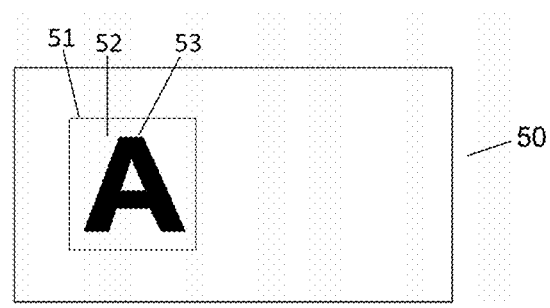
Fig. 4.2
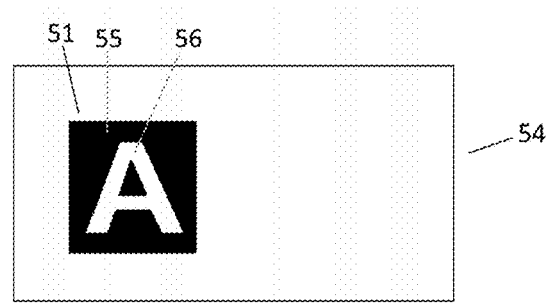
Fig. 4.3
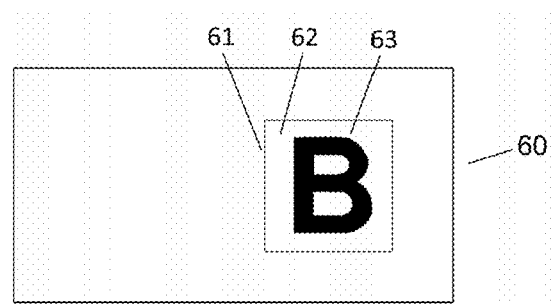
Fig. 4.4
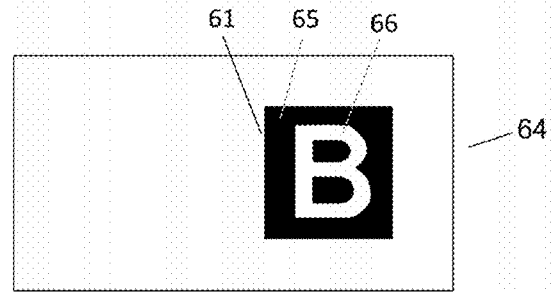
Fig. 4.5

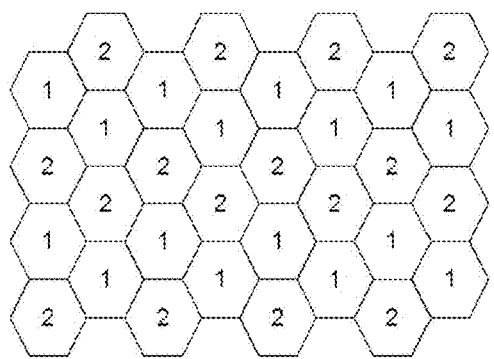
Fig. 8.1
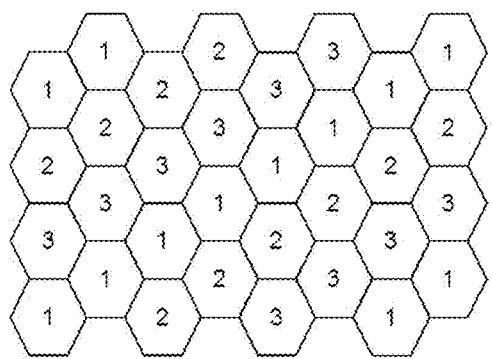
Fig. 8.2
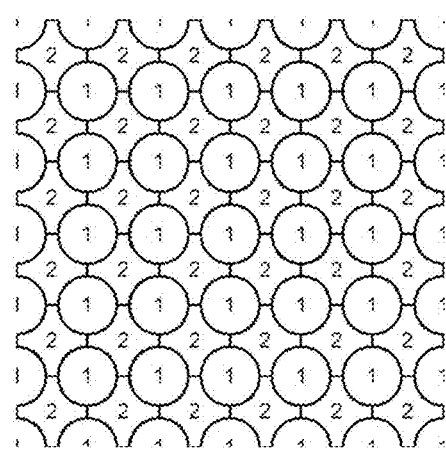
Fig. 8.3
Fig. 8.4
Fig. 8.5
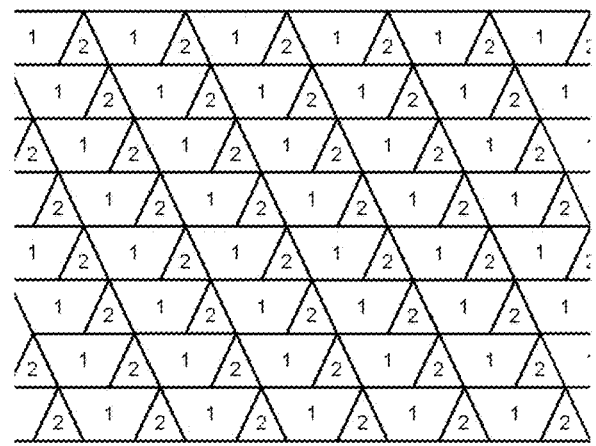
Fig. 8.6

Fig. 9.1
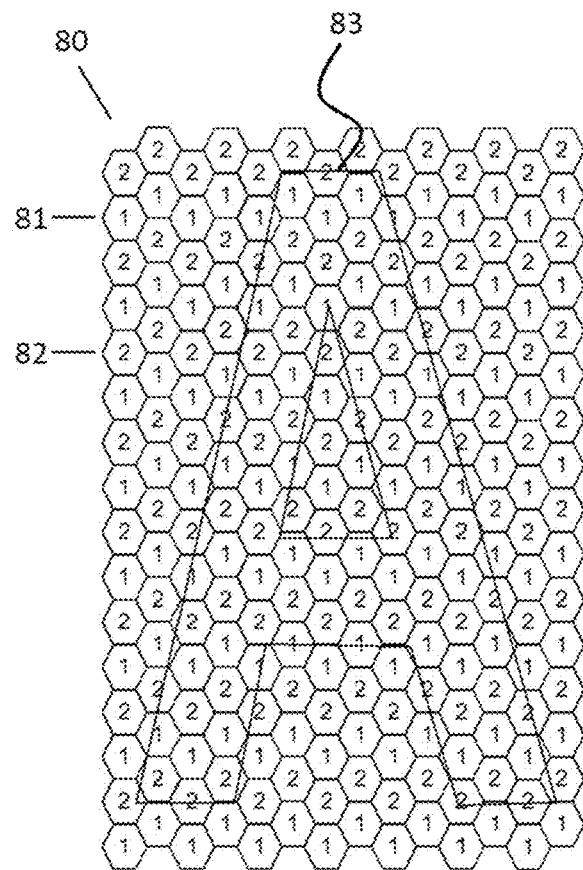
Fig. 9.2
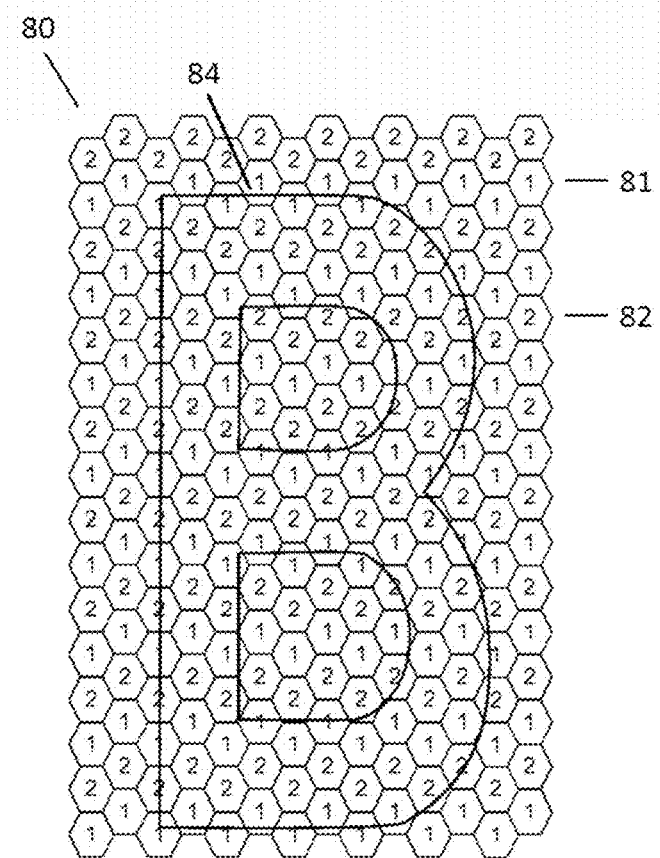

Fig. 9.3
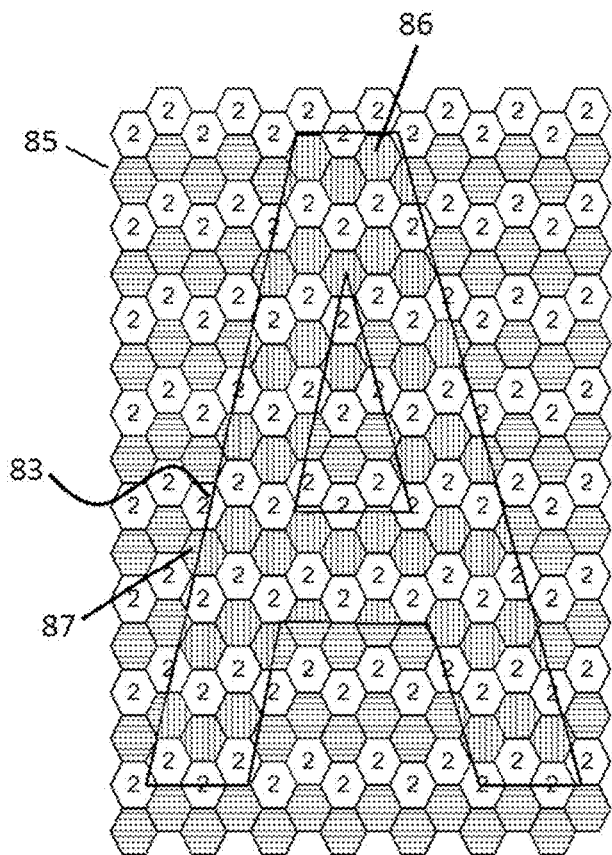
Fig. 9.4
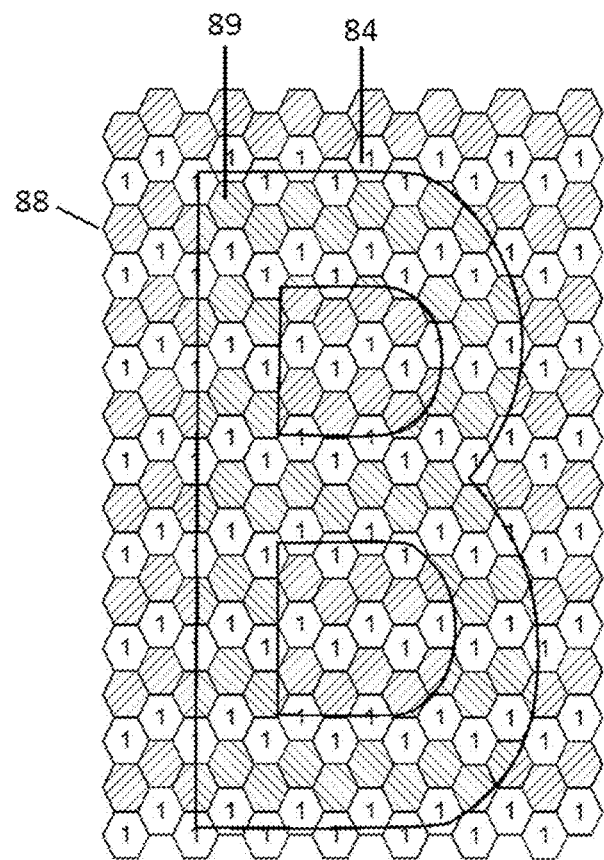

Fig. 9.5
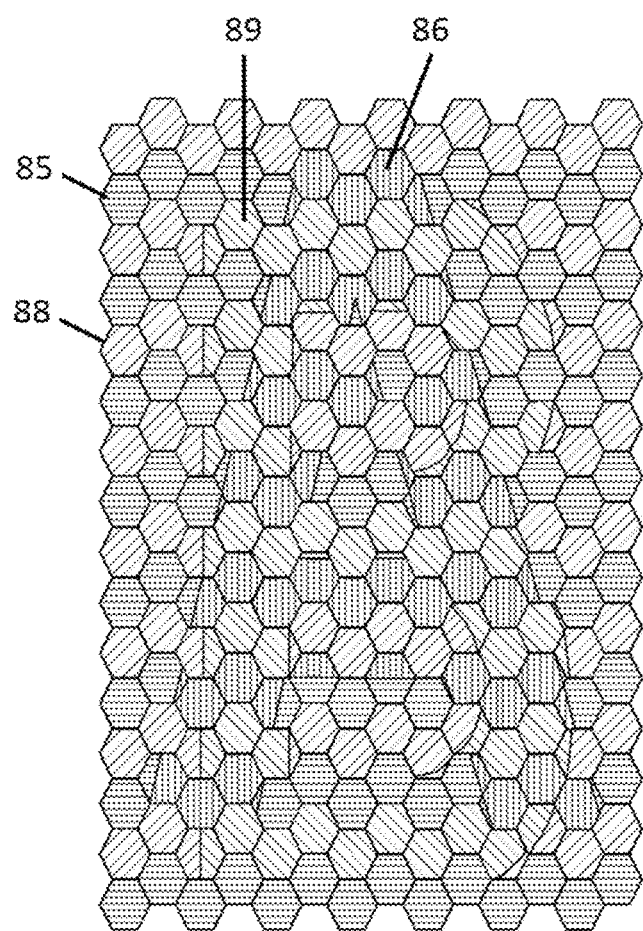

Fig. 10
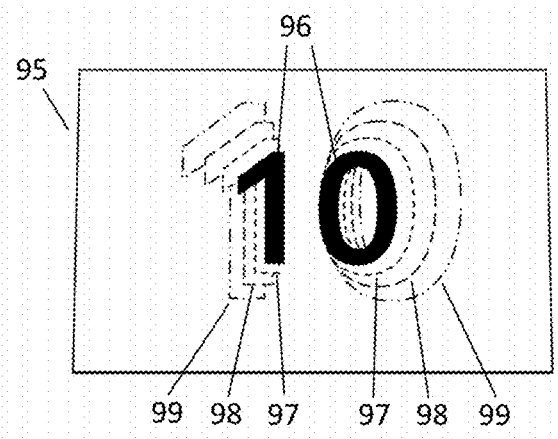
Fig. 10.1
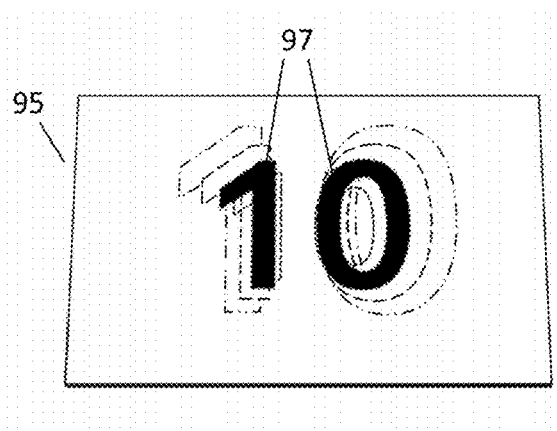
Fig. 10.2
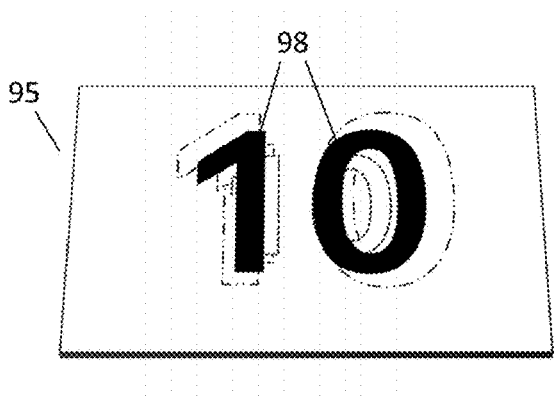
Fig. 10.3
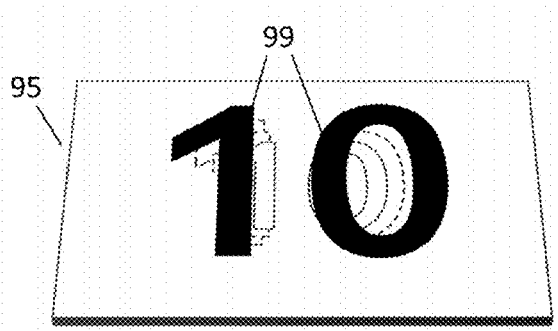
Fig. 10.4

Fig. 11
Fig. 11.1
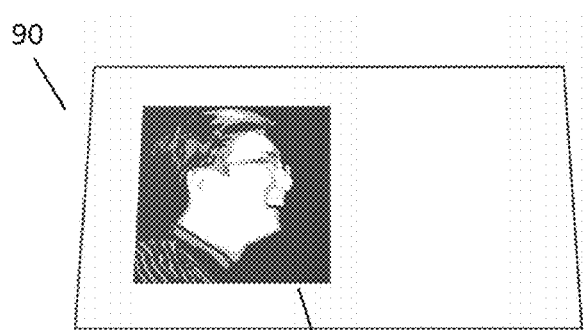
Fig. 11.2
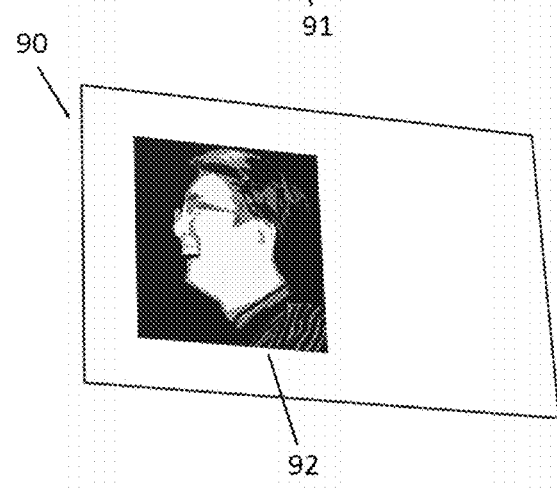
Fig. 11.3
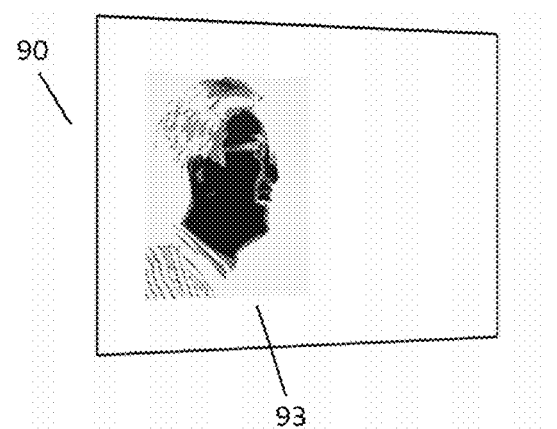
Fig. 11.4
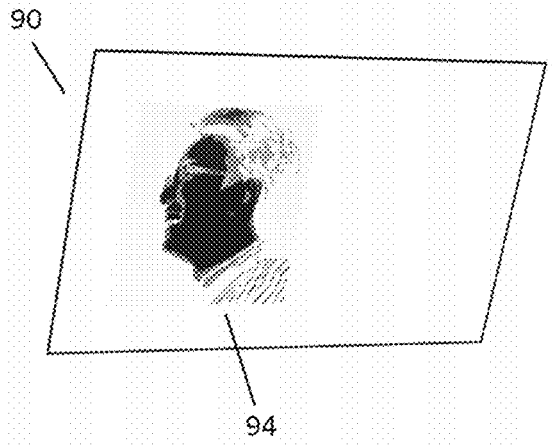

MULTIPLE IMAGE SCATTERING DEVICE

TECHNICAL FIELD

The invention relates to optical elements with patterned surface relief microstructures in which at least two images can be observed upon tilting or rotating the element. The elements according to the invention are particularly useful for securing documents and articles against counterfeiting and falsification.

BACKGROUND OF THE INVENTION

Because of the technical development, forgers nowadays have access to advanced tools, such as copy machines, scanners and printers, which allow them to copy or at least mimic the appearance of many security features with high quality. Hence, one requirement for optical security elements is that reproduction of the features is hardly possible for forgers. Although the production of such elements needs special and highly sophisticated equipment, the optical effect itself should be easily and quickly discernable even by an untrained eye.

WO2007/131375 discloses optical elements using anisotropic scattering to display high resolution optical information, for example in the form of images, photographs, graphics or lettering, with a pronounced positive-negative switch upon tilting or rotating the element, thereby producing an obvious contrast reversal of an image. The optical information may appear as black and white or colored. Because of the non-periodic, anisotropic surface relief structure, which causes the interaction with the incident light, the images appear without the typical rainbow colors of popular holograms or kinegrams. Therefore, the optical feature and the instruction how to verify it can easily be described to a layman.

There is still a constant need for novel distinctive features in optical security elements for forgery protection.

SUMMARY OF THE INVENTION

An object of the present invention is, therefore, to provide an optical element with novel security features, which can easily be verified by a person without technical means. A further object is to provide methods for manufacturing such optical components.

According to a first aspect of the invention an optical element is provided comprising areas with non-periodic, anisotropic surface relief microstructures, wherein a first and a second image is at least partially encoded by a pattern of the non-periodic, anisotropic surface relief microstructure such that when light is incident on the surface of the element the first image is optimally visible under a first viewing angle and the second image is optimally visible under a second viewing angle. The first and the second viewing angle shall not be identical.

The term "optimally visible" shall mean that the image appears with maximum contrast. Preferably, the structure of the element is such that when the first image is optimally visible the second image is not or hardly visible and that when the second image is optimally visible the first image is not or hardly visible.

There may be three or more images encoded by the pattern which are optimally visible under a third or additional viewing angles, respectively. The viewing angles under which the individual images are optimally visible are different from each other.

It is preferred that the non-periodic, anisotropic surface relief microstructure encoding for at least part of an image comprises areas with a surface modulation of transitions from bottom regions to top regions and from top regions to bottom regions. Preferably, in a first lateral direction of the surface area there is in average at least one transition from a top region to a bottom region or vice versa within every 20 micrometer, and preferably additionally in a second lateral direction of the surface area, which is perpendicular to the first direction, there is in average at least one transition from a top region to a bottom region or vice versa within every 200 micrometer. Preferably, the first direction is parallel to a symmetry direction of the anisotropic microstructure.

Preferably, there are areas wherein the average structure depth of the non-periodic, anisotropic surface relief microstructure is larger than 60 nm, more preferably, the average structure depth of the microstructure is larger than 90 nm. For the generation of colors, the average structure depth of the microstructure is preferably larger than 180 nm, more preferred larger than 300 nm and most preferred larger than 400 nm. Preferred ranges of the average structure depth for providing distinctive colors are 180 nm to 230 nm, 240 nm to 280 nm, 290 nm to 345 nm, 365 nm to 380 nm and 430 nm to 600 nm.

In the context of this application the term "image" shall stand for any kind of optical information, for example photographs, text including microtext, numbers, pictures, bar codes, symbols, characters, illustrations and graphics. Preferably, the image represents a photo, preferably a photo of a face, text, numbers or graphics.

An image can only be perceived if it is displayed with an optical contrast. As a prior art example, characters printed with a black ink on a black paper are hardly visible. It is therefore important that the background on which the characters are printed differs optically from the appearance of the characters. If the characters are printed on a white paper, the image that is perceived is black characters on a white background.

On the other hand, text may be printed in white characters with black background on a white paper, for example using an inkjet or laser printer. What is actually printed in this case are not the characters, but the background, which is printed everywhere except of the area of the characters. Even though, what is perceived as optical information is the text. Therefore, in the context of this application an image is considered as one and the same image as long as the only difference is the image contrast. In particular, an image with positive or negative contrast shall be considered as the same image. In different embodiments of the invention an image may appear with positive contrast under a first viewing angle and with negative contrast under another viewing angle. In such situations the positive and negative contrast images shall be considered as the same image and shall not be confused with the first and second image according to the invention.

In the above example, in which text is printed in black on a white paper the characters can be identified as the optical information and white paper as the background. However, for many images such an assignment cannot be done. For example, if the image is a black and white checkerboard, it is not clear whether the information consists of black squares on a white background or of white squares on a black background. Hence, in the context of this application the term "image" shall be understood to include every part that contributes to the perception of the image, such as in the above examples the characters and the background and the black and white parts of the checkerboard.

The images which, according to the invention, are at least partially encoded by a pattern of the anisotropic surface relief structure, may be split up in smaller units, such as squares or lines, in the following called image units. The image units can be spaced from each other, for example to allow different images to be interleaved.

An image may be encoded by a pattern comprising areas with and without non-periodic, anisotropic surface relief microstructures.

The area of first and second image may overlap on the surface of the element or may be separated.

Preferably, the second image comprises at least parts, which can be constructed as a geometric transformation of parts or of the whole first image. Preferably, there are areas with non-periodic, anisotropic surface relief microstructure in those parts of the first and of the second image. Examples of geometric transformations include translation, mirroring, rotation, scaling and point inversion. A geometric transformation may also be a combination of one or more of the above mentioned transformations in any sequence. The advantage of the second image being constructed from the first image by a geometrical transformation is that it can easily be described to the man in the street what will happen on tilting or rotating the optical element. There is no need to describe the content of the first image and of the second image, as it is sufficient to describe the related geometric transformation. For example, the description may be: there is a first image which appears under a first viewing angle and upon rotating or tilting the element the same image appears, but mirrored. Such an easy instruction can be memorized by any person and therefore an optical security element using such features can easily be verified by everybody.

In a preferred embodiment, the second image comprises at least parts which can be constructed from the first image or parts of it by deformation.

According to a second aspect of the invention there is provided a method for the manufacturing an element comprising an element according to the first aspect of the invention. The method for manufacturing an optical element, which has the property that when light is incident on the surface of the element a first image is optimally visible under a first viewing angle and a second image is optimally visible under a second viewing angle, comprises generating a pattern of a non-periodic, anisotropic surface relief microstructure on the element, such that the pattern comprises areas of different anisotropy directions of the microstructure and the pattern encoding information content of the second image has at least one area with an anisotropy direction which is not used in the pattern, which encodes information content of the first image.

BRIEF DESCRIPTION OF THE DRAWINGS

FIG. 1.1 is an illustration of light reflection at an isotropically structured surface.

FIG. 1.2 is similar to FIG. 1.1, but illustrates the characteristic output light distribution from a reflection at an anisotropically scattering surface.

FIG. 2 illustrates pixels with differing anisotropy direction orientation.

FIG. 3 shows an image encoded by different surface properties in different zones of the image. The example in FIG. 3.1 uses non-periodic, anisotropic surface relief microstructures as well as isotropically scattering, absorbing and reflecting properties, whereas in FIG. 3.2 the image is represented only by areas with non-periodic, anisotropic surface relief microstructures with locally different anisotropy directions.

FIG. 4.1 shows an optical element with non-periodic, anisotropic surface relief microstructures, encoding for a first and for a second image, which are optimally visible under a first and under a second viewing angle, respectively. In addition, each of the image can be seen with positive and with negative contrast depending on the viewing angle, as depicted in FIGS. 4.2-4.5.

FIGS. 8.1 to 8.6 show different shapes and arrangements of image units.

FIGS. 9.1 to 9.5 illustrate the assignment of two images to a matrix of hexagonal image units.

FIG. 10 shows an optical element wherein an image appears in different sizes, depending on the viewing angle, such that a zooming effect is perceived by an observer.

FIG. 11 shows an optical element for which a first and a second image appear at different viewing angles, wherein the second image is the mirror image of the first image.

DETAILED DESCRIPTION OF THE INVENTION

Figure 5:
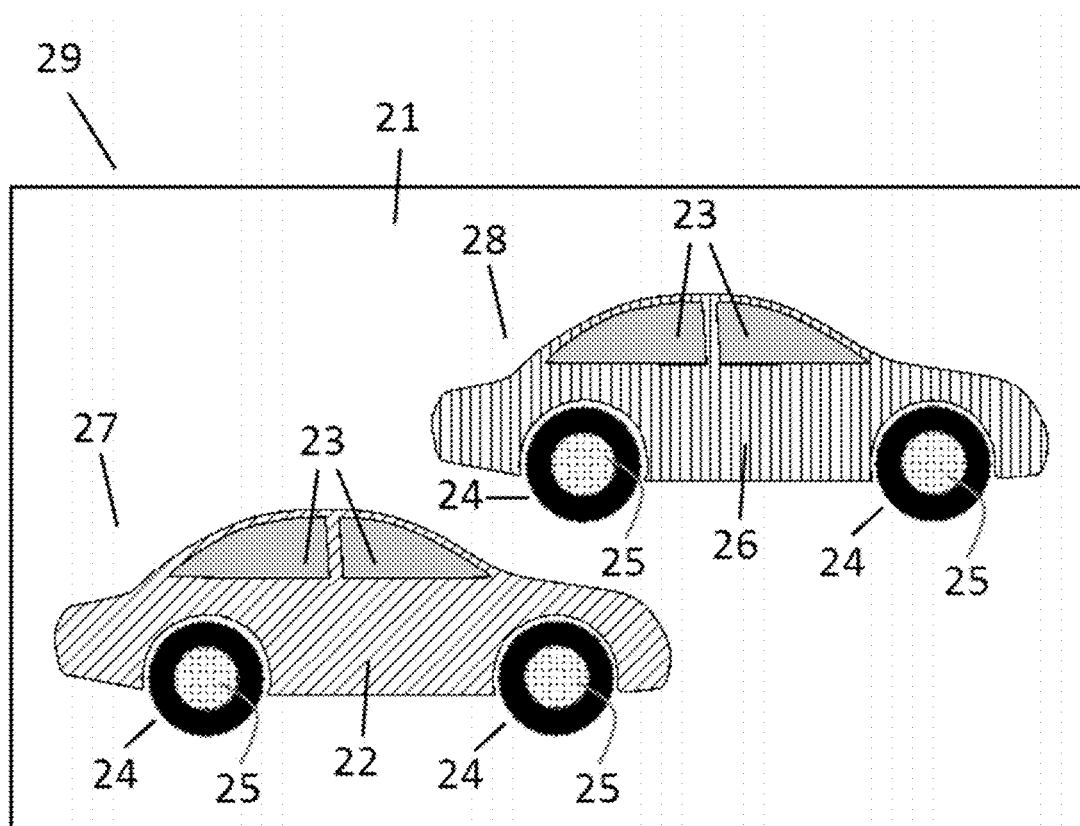
FIG. 5 shows an optical element, which comprises two images encoded by different surface properties in different zones of the image. The only difference between the two images is the anisotropy direction in the area of the non-periodic, anisotropic surface relief microstructures.

The optical effect of the elements according to the invention is based on anisotropic light scattering. FIGS. 1.1 and 1.2 illustrate the difference between isotropic and anisotropic light scattering.

Scattering at an isotropic scattering surface is such that no azimuthal direction is preferred. As indicated in FIG. 1.1, collimated incoming light 1 is redirected at the scattering surface 2 into new outgoing directions 3 with a characteristic axial-symmetric output light distribution and a characteristic divergence angle 4.

In case of an anisotropic scattering surface the light is scattered into preferred azimuthal directions. In FIG. 1.2, collimated incoming light 1 impinges on an anisotropically scattering surface 5 and is redirected into new outgoing directions 6 with a characteristic output light distribution 7.

In the context of the present invention, the term anisotropy direction shall mean a local symmetry axis within the plane of a layer, for example the direction along grooves or valleys of a microstructure.

If a surface comprises a pattern of anisotropic structures with locally differing anisotropy directions, like the directions 10, 11 in FIG. 2, then the individual areas of the pattern scatter incoming light into different directions. The pattern may then be recognized by oblique observation or by using obliquely incident light.

In general an image may be encoded by a pattern comprising areas with and without non-periodic, anisotropic surface relief microstructures. The areas without non-periodic, anisotropic surface relief microstructures may have different surface properties. For example, they may be isotropically scattering, may be reflecting or may have periodic isotropic or anisotropic structures. Further, these areas may absorb light in certain or in the whole visible wavelength range(s), which, for example, is the case if the corresponding areas are printed in any color or in white or black. An image may comprise several of these surface properties in different areas.

FIG. 3.1 illustrates an example of an image 20 encoded by areas of different optical properties. The car, which is depicted in FIG. 3.1 comprises different parts, each encoded by a different optical property. The area representing the bodywork 23 of the car may, for example, have a non-periodic, anisotropic surface relief microstructure. The area corresponding to the windows 23 may be isotropically scattering. The wheels 24 may be printed with an ink, for example, a black ink. The rims 25 may have a periodic anisotropic microstructure and the background 21 may be reflecting.

FIG. 3.2 depicts an image 30 with the same car as above, but encoded with only two kinds of areas, which both may have a non-periodic, anisotropic surface relief microstructure. The anisotropy directions of the two areas are different from each other. For example, the areas representing the bodywork 32 and the wheels 34 have the same anisotropy direction, whereas the windows 33, the rims 35 and the background have another anisotropy direction.

If the pattern representing an image comprises at least two areas with non-periodic, anisotropic surface relief microstructure of different anisotropy directions, such as that of FIG. 3.2, the two anisotropy directions preferably differ by an angle between 80° and 100°, more preferred between 85° and 95° and most preferred by an angle of 90°. Optical elements comprising such pattern show a pronounced positive-negative switch upon tilting or rotating the element.

An example of the invention is shown in FIGS. 4.1 to 4.5. In FIG. 4.1, an optical component 40 is shown, which comprises areas with non-periodic, anisotropic surface relief microstructures, which encode for a first and for a second image. The first image is the character "A" represented by a pattern 41 of a microstructure 43 on a background with a microstructure 42. The microstructures 42 and 43 differ by the anisotropy directions, which make an angle of 90° with each other. For example, the anisotropy direction of microstructure 43 is oriented at 45° and the microstructure 46 is oriented at 135° with regard to a reference direction. The second image 44 is the character "B" represented by a pattern 44 of a microstructure 46 on a background with a microstructure 45. The microstructures 45 and 46 differ by the anisotropy directions, which make an angle of 90° with each other. For example, the anisotropy direction of microstructure 45 is oriented at 0° and the microstructure 46 is oriented at 90° with regard to the above reference direction. The anisotropy directions of the microstructures related to image 41 are rotated with regard to that of image 44 by 45°. The microstructures mentioned above with regard to FIG. 4 are non-periodic, anisotropic surface relief microstructures.

FIG. 4.2 shows the appearance 50 of the optical element 40 under a first viewing angle, for which the first image 51 is optimally visible. The observer sees a dark character "A" on a bright background, which is in this case considered as a positive contrast. FIG. 4.3 shows the appearance 54 of the optical element 40 under another viewing angle, for which the first image 51 is optimally visible. The observer sees a bright character "A" on a dark background, which, accordingly, appears with a negative contrast.

FIG. 4.4 shows the appearance 60 of the optical element 40 under a second viewing angle, for which the second image 61 is optimally visible. The observer sees a dark character "B" on a bright background; hence it appears with a positive contrast. FIG. 4.5 shows the appearance 64 of the optical element 40 under another viewing angle, for which the second image 61 is optimally visible. The observer sees a bright character "B" on a dark background, which, accordingly, appears with a negative contrast.

In general, the anisotropy directions of the microstructures related to the first and second image may differ by any angle. However, it is preferred that there is a region related to the first image and a region related to the second image, both having a non-periodic, anisotropic surface relief microstructure, such that the anisotropy directions of said regions of first and second image differ by an angle between 22.5° and 67.5°, more preferred between 30° and 60° and most preferred between 40° and 50°.

In preferred embodiments of the invention, the second image comprises at least parts, which can be constructed as a geometric transformation of parts or of the whole first image. Preferably, there are areas with non-periodic, anisotropic surface relief microstructures in those parts of the first and of the second image. Examples of geometric transformations include translation, mirroring, rotation, scaling and point inversion. The center of rotation or scaling may be everywhere, in particular it could be inside the area of the image or outside of it. Preferably, the center of scaling coincides with the center of the image. Similarly, the inversion center for point inversion could be inside the area of the image or outside of it. Also, the mirror line for mirroring operations may be everywhere; in particular it may be inside the area of the image or outside of it. A geometric transformation may also be a combination of one or more of the above mentioned transformations in any sequence. Mirror symmetric images shall not be regarded as a result of a mirror operation. For example, letters like "A", "H", "I", "M", "O", "T", "U", "V", "W", "X" are mirror symmetric and a mirror operation could also be construed as a combination of translation and rotation. The geometric transformation shall only relate to the image, not to the surface relief microstructure which may encode the image. For example, if the geometric transformation includes a rotation by a certain angle, then the anisotropy directions of areas in the second image do not have to be rotated by the same angle with regard to the corresponding areas of the first image. As a second example, if the geometric transformation includes a scaling operation, then this only refers to the image, but the microstructure does not have to be scaled.

Different parts of an image may be transformed individually. For example, each digit of a number may be scaled from a different center of scaling.

FIG. 5 illustrates an example of an optical element 29 according to the invention, wherein a second image 28 is constructed from a first image 27, which is a car, by a translation. The only difference between the first and the second image is the position and the anisotropy directions of the non-periodic, anisotropic surface relief microstructures in the area of the bodywork 22, 26 of the car, which differs, for example, by 45°. The other areas of the car may have the same properties as those mentioned with regard to FIG. 3.1, which means the area corresponding to the windows 23 may be isotropically scattering; the wheels 24 may be printed with an ink, for example, a black ink; the rims 25 may have a periodic anisotropic microstructure and the background 21 may be reflecting. Accordingly, the bodywork of the car in the first image, and therefore also the first image itself, is optimally visible under a first viewing angle and the bodywork of the car in the second image, and therefore also the second image itself, is optimally visible under a second viewing angle.

Figure 6:
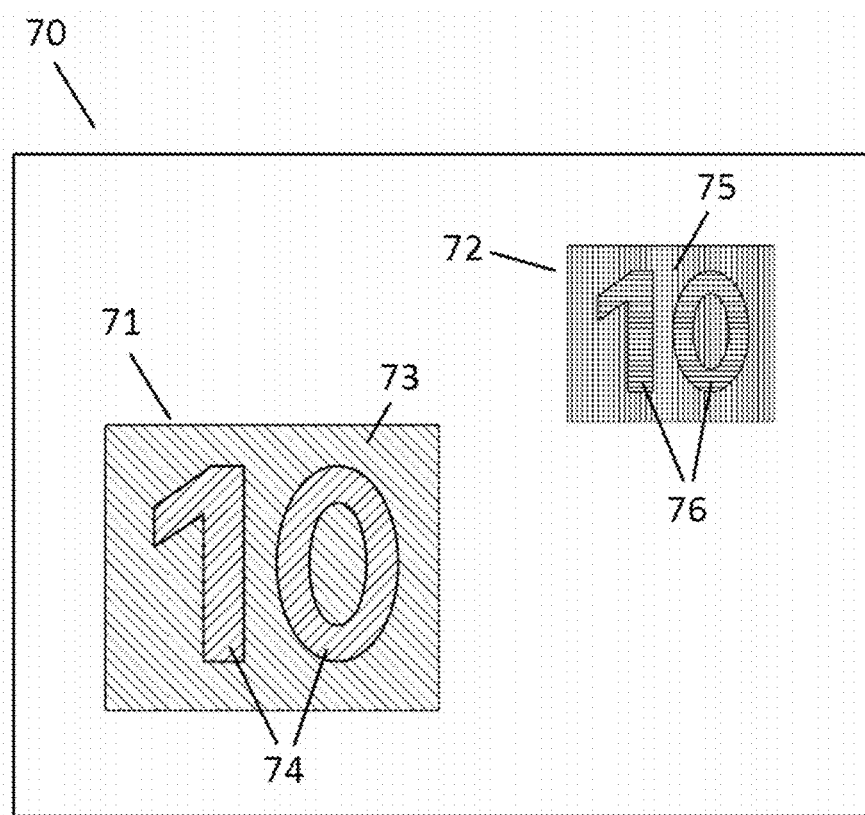
FIG. 6 illustrates an example of a preferred embodiment of the invention in which the second image has been constructed as a geometric transformation of the first image, in this case a combination of scaling and translation.

FIG. 6 illustrates an optical element 70 as an example of the invention, wherein a second image 72 is constructed from a first image 71 by a translation and scaling, which means that the image 71 appears in reduced or enlarged scale at a different position, depending on the viewing angle. The geometric transformation could also be a scaling with a scaling center outside the area of the first image. In the example, the areas 74 corresponding to the digits of the number "10" in the first image 71 as well as the background 73 have a non-periodic, anisotropic surface relief microstructure, wherein the anisotropy directions differ, for example, by 90°. The image 72 is also encoded by a pattern of a non-periodic, anisotropic surface relief microstructure, with areas 76 and 75 representing the digits of the number "10" and the background, respectively. The anisotropy directions in the areas 75 and 76 may differ, for example, by 90°. The anisotropy directions in the areas of the digits 74, 76 may differ by 45°. Similarly, the anisotropy directions in the background 73, 75 may differ by 45°. Accordingly, the first image is optimally visible under a first viewing angle and the second image is optimally visible under a second viewing angle. Because of the microstructures of the digits and of the background, both images 71 and 72 appear as a positive image and as a negative image, depending on the viewing angle.

Figure 7:
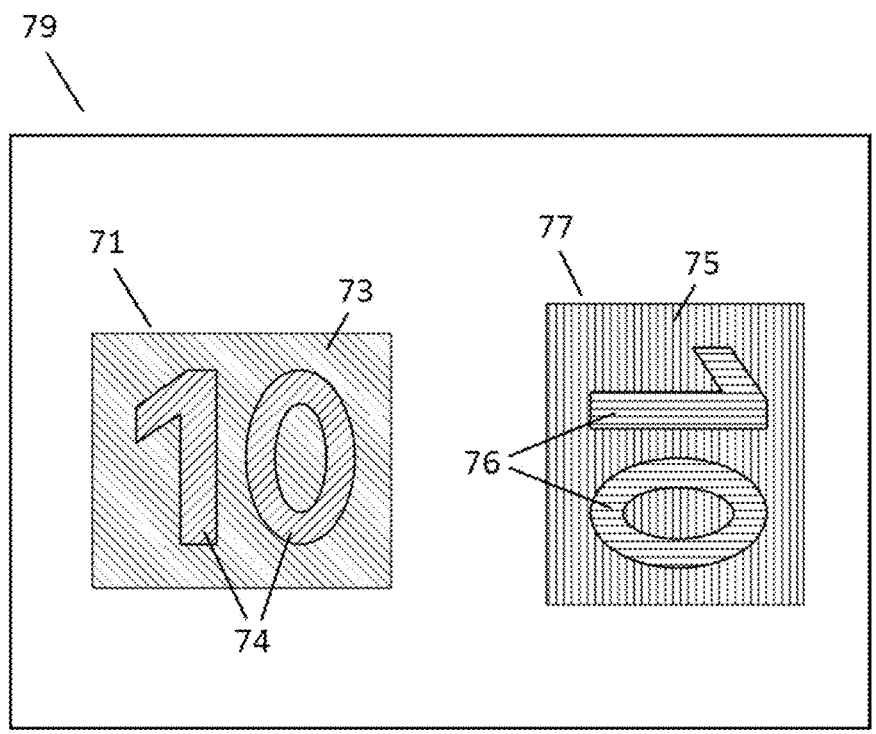
FIG. 7 illustrates an example of a preferred embodiment of the invention in which the second image has been constructed as a geometric transformation of the first image, in this case a combination of rotation and translation.

FIG. 7 illustrates an optical element 79 as an example of the invention, wherein a second image 77 is constructed from a first image 71 by a translation and rotation. In the example, the areas 74 corresponding to the digits of the number "10" in the first image 71 as well as the background 73 have a non-periodic, anisotropic surface relief microstructure, wherein the anisotropy directions differ, for example, by 90°. The image 77 is also encoded by a pattern of a non-periodic, anisotropic surface relief microstructure, with areas 76 and 75 representing the digits of the number "10" and the background, respectively. The anisotropy directions in the areas 75 and 76 may differ, for example, by 90°. The anisotropy directions in the areas of the digits 74, 76 may differ by 45°. Similarly, the anisotropy directions in the background 73, 75 may differ by 45°. Accordingly, the first image is optimally visible under a first viewing angle and the second image is optimally visible under a second viewing angle. Because of the microstructures of the digits and of the background, both images 71 and 72 appear as a positive image and as a negative image, depending on the viewing angle.

The information content of an image may be split up in image units. Image units assigned to a first, second or additional image can then be distributed such that they share a certain area. In this way it is possible to place the different images substantially at the same position, such that they partially or fully overlap. The image units may have any shape, such as a polygon, preferably a regular polygon, or a circle. Preferred shapes are quadratic, rectangular, trapezoid, triangular, hexagonal and circular. FIG. 8.1 shows an area split up in hexagons, which are assigned either to the information content of a first or of a second image. An exemplary assignment is indicated by the numbers 1 and 2 inside the hexagons. FIG. 8.2 shows an example of an area split up in hexagons, wherein hexagon image units are shared between the information content of three images. An exemplary assignment is indicated by the numbers 1, 2 and 3 inside the hexagons. FIG. 8.3 shows an example of squares, assigned to the information content of a first and a second image, respectively. In FIG. 8.4 alternating stripes are assigned to a first and a second image, respectively. The image units corresponding to the information content of the different images can be arranged in different ways, for example in alternating lines, such as in FIG. 8.4, or arranged in rows and/or columns, such as in FIG. 8.3, or in more complex distributions.

The image units related to the information content of the different images may differ in size, shape and number. For example, circular areas may be used to encode the information content of the first image and the area in between the circular areas may be used to encode the information content of the second image, such as in the example of FIG. 8.5. Another example is depicted in FIG. 8.6, where trapezoid shaped units are assigned to the information content of the first image and triangular shaped units are assigned to the information content of the second image. In areas comprising image units of different images the total area of image units encoding the information content of the different images may be different, such as, for example, the total area of the trapezoid units and triangular units of FIG. 8.6. This allows to control the optical contrast of the different images and therefore to balance the optical impression. For example, it is possible that one image appears very weak, whereas another image appears with a much higher contrast and is therefore dominant. For many applications the total area of image units assigned to the individual images is about the same. In cases, in which the total area of image units assigned to the individual images is not equally balanced, it is preferred that the ratio of the largest total area to the smallest total areas is 1.3:1 or higher, more preferred 1.6:1 or higher and most preferred 2:1 or higher.

Image units can also be used to adjust the perceived grey level of an image by dithering, which means that the brightness of an area is an average over a number of image units. The image units, which cause averaging to a grey level may have, for example, two different anisotropy directions, which for a certain viewing angle may be perceived as dark or bright, respectively, which the observers eye averages to a grey impression. Preferably, an image used in an optical element according to the invention has areas with non-periodic, anisotropic surface relief microstructures that encode for more than two grey levels. Even more preferred are images in which the non-periodic, anisotropic surface relief microstructures encodes for more than 7, more than 15, more than 31 or more than 63 grey levels.

FIGS. 9.1 to 9.5 show an example in which the character "A" as a first image and the character "B" as a second image overlap with each other and both are encoded by non-periodic, anisotropic surface relief microstructures with different anisotropy axes. In the example, the area 80 is divided in hexagonal image units assigned either to the first or to the second image, indicated by the number 1 inside hexagons 81 or the number 2 inside hexagons 82, respectively. FIG. 9.1 shows the desired shape and position 83 of the character "A" within the area of the hexagon matrix 80. FIG. 9.2 shows the desired shape and position 84 of the character "B" within the area of the hexagon matrix 80. FIG. 9.3 shows the patterning of the hexagon units, which are assigned to the first image, whereas the hexagons assigned to the second image are indicated by the numeral 2. In the example of FIG. 9.3 those parts of the image units which overlap with the shape 83 of character "A" have a non-periodic, anisotropic surface relief microstructure with a first anisotropy direction 86, indicated by the hatching direction, whereas the non-overlapping areas have a non-periodic, anisotropic surface relief microstructures with a second anisotropy direction 85. In the drawing of FIG. 9.3 the first and second directions are assumed to be perpendicular to each other. Hexagon units which partially overlap with the character "A" may have a uniform anisotropy direction, for example determined by the larger of the overlapping or non-overlapping area. For better image resolution it is preferred to split the image units in overlapping and non-overlapping parts and apply the corresponding anisotropy direction of the microstructure, as this is indicated in the drawing of FIG. 9.3 by the corresponding hatching directions, for example in hexagon 87.

In the same way, FIG. 9.4 shows the patterning of the hexagon units which are assigned to the second image, whereas the hexagons assigned to the first image are indicated by the numeral 1. Those parts of the image units which overlap with the shape 84 of character "B" have a non-periodic, anisotropic surface relief microstructure with a third anisotropy direction 89, indicated by the hatching direction, whereas the non-overlapping areas have a non-periodic, anisotropic surface relief microstructures with a fourth anisotropy direction 88. In the drawing of FIG. 9.4 the third and fourth directions are assumed to be perpendicular to each other. For hexagon units which partially overlap with the character "B" the area is split in overlapping and non-overlapping parts and the corresponding anisotropy direction of the microstructure is indicated in the drawing of FIG. 9.4 by the corresponding hatching direction. The third anisotropy direction 89 is preferably oriented at an angle of +45° or −45° with regard to the first anisotropy direction 86. The fourth anisotropy direction 88 is preferably oriented at an angle of +45° or −45° with regard to the second anisotropy direction 85.

The contours of the desired characters A and B in FIGS. 9.3 and 9.4 are only shown for illustration of the patterning concept but do not form part of the pattern, except of those boundaries which occur because of subdividing image units into overlapping and non-overlapping parts.

FIG. 9.5 shows the full pattern, which results from patterning according to FIGS. 9.3 and 9.4. The shapes of the characters A and B are not shown anymore, with the exception of boundaries between areas of different microstructure directions inside of image units that have been subdivided into overlapping and non-overlapping parts.

When light is incident on an optical element comprising the pattern of non-periodic, anisotropic surface relief microstructures of FIG. 9.5 the character "A" is optimally visible under a first viewing angle and the character "B" is optimally visible under a second viewing angle. Both characters appear almost at the same position of the optical element. Because of the microstructures within the area of the characters and of the background, both characters appear as a positive image and as a negative image, depending on the viewing angle.

In preferred embodiments of the invention, the second image comprises at least parts, which can be constructed by scaling at least parts of the first image, wherein areas of the first and second image overlap. Preferably, the overlapping areas are divided in image units, such that parts of the first, second or more images can be assigned to different image units as described above. The center of scaling may be inside or outside of the image. In this case the second image appears as an increased or reduced image of the related parts of the first image. Preferably, the optical component comprises a third or more images, which are at least partially encoded by a pattern of the non-periodic, anisotropic surface relief microstructure and which are optimally visible under a third or additional viewing angles, respectively. The assignment as second, third or higher number of image shall be such that it corresponds to the sequence of the appearance of the related images upon rotating or tilting the optical element. Like the second image, the third or additional images comprise at least parts, which can be constructed by scaling at least parts of the first image, wherein areas of the first and third and optional additional images overlap. The center of scaling for the construction of the second, third and optionally additional images preferably coincides with each other. The scaling factor for the construction of the second, third and optionally additional images is different from each other. Preferably, the scaling factor increases or decreases monotonically with the sequence of the images. The optical effect that is perceived by an observer when tilting or rotating the optical element is that of zooming an image in or out, respectively. FIG. 10 shows an example of an optical element which provides a zooming effect upon changing the viewing angle. The optical element 95 comprises a first image 96, which is optimally visible under a first viewing angle, illustrated in FIG. 10.1. The first image is the number 10 with a first size. The image is encoded by a non-periodic, anisotropic surface relief microstructure with a first anisotropy direction. FIG. 10.1 also indicates a second image 97, a third image 98 and a fourth image 99 by its contours. The first, second, third and fourth images partially overlap with each other. Preferably, overlapping areas the images in overlapping areas are split up in image units, such that parts of the individual images can be assigned to different image units as described above. Each of the second, third and fourth images is constructed from the first image by a different scaling factor, such that the size of the images increases in the order of the images. The scaling center coincides with the center of the first image, but it may be at any other position as mentioned above. The first, second, third and fourth image, are encoded by a non-periodic, anisotropic surface relief microstructure, each with a different anisotropy direction. The areas outside the numeral 10 may also comprise a non-periodic, anisotropic surface relief microstructure, but with an anisotropy direction different from the anisotropy directions of each of the images. However, these areas, which are the background for each of the four images may have any other surface property. At the first viewing angle only the image 96 is optimally visible, whereas the images 97, 98 and 99 are only visible with a lower contrast compared to the first image 96 or are even not visible. For a second viewing angle, which can for example be adjusted by further tilting the optical element 95, the image 97 becomes optimally visible, as is illustrated in FIG. 10.2. By further tilting the optical element, the third image 98 becomes optimally visible at a third viewing angle and the fourth image 99 becomes optimally visible at a fourth viewing angle. By continuously tilting the optical element the four images become sequentially visible, which gives the impression of zooming in or out depending on the tilting direction.

In another preferred embodiment of the invention, the first image has a three dimensional appearance, which means it is perceived by an observer as having some depth. The second image is then a depth inversed image. For example, the first image may give the impression that at least parts of the image are above the plane of the optical element, which means between the optical element and the observer. The second image has then at least parts which seem to be behind the optical element plane. Preferably, the information content of first and second image is mainly identical, except of the depth perception. There are several design methods known in the art to give an image a certain depth impression. Well known examples are the button icons used in user interfaces of computer programs, which can change the appearance from non-pushed to pushed. Preferably overlapping areas of first and second image are divided in image units, such that parts of the first and second image can be assigned to different image units as described above.

In one of the preferred embodiments of the invention, the second image comprises at least parts, which can be constructed by mirroring at least parts of the first image. The mirror line can be at any position and can have any direction. Preferably, the geometric transformation from the first to the second image includes a translation. Accordingly, the second image may fully or partially overlap with the first image, even in case the mirror line is outside the area of the first image. Preferably the overlapping areas are divided in image units, such that parts of the first, second or more images can be assigned to different image units as described above. FIG. 11 shows an example of an optical element 90 according to the invention, wherein the second image 92 in FIG. 11.2 is a mirror image of the first image 91 in FIG. 11.1 and both the first and the second image appear at the same position, but for different viewing angles. By tilting or rotating the element, the observer can switch between the image and the mirror image. In addition, both the image and the mirror image appear as negative image 93, 94 in FIGS. 11.3 and 11.4 upon tilting or rotating the element for adjusting the proper viewing angle. The different viewing angles for observation are indicated in FIG. 11 by the different perspectives of the optical element. It is not required to give detailed instructions regarding proper viewing angles to an observer, because then the verification of the optical features would require tools for measurement of angles and the verification process would get complex and time consuming. The only instruction which an observer needs to be able to verify the optical features is to rotate and tilt the element as the first and second image automatically appear as positive and as negative image once the orientation is such that respective viewing angle range is adjusted. Having the image and the mirror image overlapping at the same position has the surprising effect that the image makes a transition to its mirror image by changing the viewing angle. Of course, it is also possible to position the mirror image somewhere else in the optical element.

Contrary to a periodic structure, which repeats itself after a certain interval, and which is therefore predictable once the structure of a period is known, as the surface profile of a non-periodic structure cannot be predicted at a distance from a known part of the structure. For determination of a surface profile being non-periodic the autocorrelation function and a related autocorrelation length can be used. The autocorrelation function of a surface profile can be understood as a measure for the predictability of the surface profile for two spatially separated points by a distance x in the plane.

The autocorrelation function $AC(x)$ of a function $P(x)$, such as the surface relief microstructure profile, is defined as $$AC(x) = \int P(x') \cdot P(x'+x) \cdot dx'$$

For a non-periodic or non-deterministic surface profile, the autocorrelation function decays rapidly with increasing x. On the other hand, for a deterministic surface profile found for instance in a grating, the autocorrelation function is modulated with a periodic function but the amplitude does not decay.

With the help of the autocorrelation function, a single characteristic number, an autocorrelation length L, can be defined. It is the length for which the envelope of the autocorrelation function decays to a certain threshold value. For the present purpose, a threshold value of 10% of $AC(x=0)$ proved to be suitable.

In the context of the present invention it is preferred that a non-periodic, anisotropic surface relief microstructure has at least in one direction an averaged one-dimensional autocorrelation function $AC(x)$ that has an envelope, which decays to 10% of the AC at x=0 within an autocorrelation length, wherein the autocorrelation length is smaller than three times an average lateral distance between adjacent transitions of top and bottom regions, such as hills and valleys. Preferably, the one direction is perpendicular to the anisotropy direction. Preferably, the anisotropic surface relief microstructure is also modulated along the anisotropy direction y, such that the envelope of an averaged autocorrelation function $AC(y)$ decays to 10% of the AC at y=0 within an autocorrelation length, wherein the autocorrelation length is smaller than three times an average lateral distance between adjacent transitions of top and bottom regions along the anisotropy direction.

More preferred are surface relief microstructures, wherein the autocorrelation length is smaller than two times an average lateral distance between adjacent transitions of top and bottom regions. Even more preferred are surface relief microstructures, wherein the autocorrelation length is smaller than one average lateral distance between adjacent transitions of top and bottom regions.

Preferably, the autocorrelation length (L) is greater than one hundredth average lateral distance between adjacent transitions of top and bottom regions.

There are different known methods, which can be used to generate non-periodic, anisotropic surface relief microstructures, such as self-organization in copolymer or dewetting, laser ablation, electron- or ion beam lithography and nanoimprint lithography. The microstructures can, for example, simply be replicated by embossing using an embossing tool containing the microstructure.

A preferred method of manufacturing non-periodic, anisotropic surface relief microstructures is described in the international patent application WO-01/29148, the content of which is incorporated herein by reference. The method makes use of the so called monomer corrugation (MC) technology. It relies on the fact that phase separation of special mixtures or blends applied to a substrate is induced by crosslinking, for instance by exposure to ultraviolet radiation. The subsequent removal of non-crosslinked components leaves a structure with a specific surface topography. The term MC-layer is used for layers prepared according to this technology. Anisotropy of the microstructure can, for example, be achieved if liquid crystalline mixtures are used, which are aligned by an underlying alignment layer. By using an alignment layer with an orientation pattern, it is possible to create a patterned, non-periodic, anisotropic surface relief microstructures.

WO-2006/007742 discloses methods to produce modified MC-layers and layer structures, which generate pastel-colored appearance under certain observation angles.

WO2007/131375 discloses methods to generate non-periodic, anisotropic surface relief microstructures having top and bottom plateaus, which allows to generate pastel colors, which, in contrast to colors generated by gratings, hardly change with the incidence angle of light. As different regions of the surface may have different depths of the structure, originally white light scattered by such structures may change into different colors, depending on the region from where it is scattered.

Preferably, the method comprises the steps of coating a thin photo-alignment film on a substrate, generation of an orientation pattern by exposing individual areas of the photo-alignment film to linearly polarized UV light of different polarization directions, coating a blend of cross-linkable and non-crosslinkable liquid crystal materials on top of the photo-alignment film, cross-linking the liquid crystalline blend and removing the non-cross-linked material, for example using an adequate solvent.

Cross-linking of the liquid crystalline blend is preferable done by exposure to actinic light. The cross-linking process induces a phase separation and cross-linking of the liquid crystal prepolymer. The basic principles and the optical behavior of micro-corrugated thin-films are for example disclosed in the international patent application WO-A-01/29148.

In an additional step, the thickness of the layer, which comprises the surface relief microstructure, is reduced by wet or dry etching, until the material of layer in the lower zones of the corrugated surface is cleared away and parts of the underlying substrate are set free. Subsequently the substrate is etched through the freed parts of the corrugated layer by dry or wet etching. By this process the microstructure of the corrugated layer is transferred into the substrate as a binary structure having two plateaus, which are the top and bottom regions of the structure.

The depth of the microstructure etched into the substrate depends on the etching time and the etching velocity in the substrate. Consequently, it is possible to adjust the depth of the microstructure by controlling the etching time. Preferably, there are areas wherein the average structure of the copied microstructure is larger than 60 nm, more preferably, the depth of the copied microstructure is larger than 90 nm. For the generation of colors, the average structure depth of the microstructure is preferably larger than 180 nm, more preferred larger than 300 nm and most preferred larger than 400 nm. Preferred ranges of the average structure depth for providing distinctive colors are 180 nm to 230 nm, 240 nm to 280 nm, 290 nm to 345 nm, 365 nm to 380 nm and 430 nm to 600 nm.

Preferably, an image is encoded at least partially by non-periodic anisotropic surface relief microstructures of different structure depth in different areas. Such an image appears with locally different colors or grey levels. The creation of different depths can, for example, be done by locally blocking or delaying etching into the substrate.

In a preferred embodiment of the invention the non-periodic, anisotropic surface relief microstructure encoding for at least part of an image comprises areas with a surface modulation of transitions from bottom regions to top regions and from top regions to bottom regions, wherein in a (first) lateral direction of the surface area there is (in average) at least one transition from a top region to a bottom region or vice versa within every 20 micrometer, and preferably additionally in a second lateral direction of the surface area, which is perpendicular to the first direction, there is in average at least one transition from a top region to a bottom region or vice versa within every 200 micrometer.

Preferably, an image is at least partially encoded by a non-periodic, anisotropic surface relief microstructure in which in a first lateral direction, the average lateral distance between adjacent transitions from a top region to a bottom region or vice versa lies in the range from 0.5 micrometer to 10 micrometers. Advantageously, the average lateral distance lies in the range from 0.5 micrometer to 5 micrometers. Advantageously in the second lateral direction, which is perpendicular to the first lateral direction, the average distance between transitions from a top region to a bottom region is less than 100 micrometers, more advantageously less than 50 micrometers.

To describe anisotropic surface relief structures the term surface relief aspect ratio (SRAR) is defined for the context of this invention as the average length to width ratio of the anisotropic surface relief patterns. The SRAR strongly determines the azimuthal optical appearance of light scattered at the surface relief microstructure. For SRAR=1, which corresponds to surface relief patterns which exhibit in average the same extension in at least two lateral directions, the scattering properties for incident light is almost independent on the azimuthal incident angle of the light. Therefore, the intensity of light reflected from the surface of relief microstructures with SRAR=1 does almost not change when the element containing the surface relief microstructure is rotated along an axis perpendicular to the surface of the element.

For anisotropic relief structures, which means SRAR>1, the intensity of the reflected light depends on the azimuthal incidence angle of the light. In order to be able to visually recognize this dependency on the azimuthal incident angle, SRAR should be larger than 1.1. To increase the visible contrast of images set-up of patterns of surface relief structures with different anisotropic axis, SRAR values larger than 2 are preferable. Even more preferable are SRAR values larger than 5.

For very large SRAR values the range of azimuthal angles into which a significant amount of light is scattered becomes smaller, which makes it more difficult to recognize the reflected light from an image made of surface relief patterns. Therefore, preferably, there is at least one area in which the SRAR is less than 50, more preferably the SRAR is less than 20.

In the context of the present invention the term 'surface relief fill factor' is defined as the ratio of the total area of top regions to the integrated area over all top and all bottom regions. Preferably, there is at least one area in which the surface relief fill factor lies in the range from 0.050 to 0.95, more preferably in the range of 0.2 to 0.8 and even more preferably in the range of 0.3 to 0.7.

In the context of the present invention a plateau shall be defined as an area within a microstructure in which the height of the structure varies less than 20% of the mean depth of the structure.

Preferably, optical elements according to the invention are at least partially reflective. The optical elements according to the invention therefore preferably comprise reflective or partially reflective layers using materials such as gold, silver, copper, aluminum, chromium or pigments. The reflective or partially reflective layers may further be structured such that they cover only part of the optical element. This can be achieved, for example, by structured deposition of the layer or by local de-metallization.

Reflection can also be caused by a transition to a material having a different index of refraction. Therefore, in a preferred embodiment of the invention the surface of the microstructure of an optical element according to the invention is at least partially covered with a dielectric material. Examples of high index refraction materials are ZnS, ZnSe, ITO or TiO2. Composite materials including nanoparticles of high index refraction materials could also be suitable. The cover medium may also be absorptive for certain colors to change the color appearance of the device.

Optionally, the surface relief microstructures of an optical element according to the invention may be sealed in order to protect the element against mechanical impact, contamination and in order to prevent unauthorized and illegal making of replicas of such elements. Therefore, optical elements according to the invention preferably comprise a sealing layer on top of the microstructure.

Depending on the depth of the microstructures interference colours may be generated. A broad color palette may be obtained, for example, from lower to deeper modulation the colors yellow, orange, rose, violet, blue and green. For even deeper structures, higher order colors can appear. The interference colours typically show a pronounced angular dependency. Under certain angles the colours will be seen, whereas for other angles the colours may change or disappear. A pattern is therefore recognized as a coloured pattern, for which the colours depend on the observation angle and/or the incident angle of the light.

Optical elements according to the invention may also incorporate other security features. Some of them may already be present in the master used for production of the elements. Such features are, for example, holograms or kinegrams. Other security features, which could be first, second or third level security features, may be added in an additional process and/or in an additional layer. The additional features may be permanently visible without generating a specific optical effect. Preferably, the additionally added feature shows a viewing angle dependency, for example realized by again by holograms or kinegrams or by cholesteric or interference layers. In a more preferred embodiment a second level security feature is added, which cannot be detected without using an observation tool. Such features are for example introduced by fluorescent or by birefringence materials. Especially preferred are birefringent layers which comprise areas of different retardation or optical axis orientation. The security feature stored in such a birefringent layer is only visible by observation with polarized light, for example using polarizer sheets. In addition the optical element may comprise magnetic areas.

Optical elements produced according to the present invention can be used in different applications which deal with spatial modulation of the light intensity. Preferably the optical elements according to the invention are used as security elements in security devices. Specifically such security devices are applied to or incorporated into documents, passports, licenses, stocks and bonds, coupons, cheques, certificates, credit cards, banknotes, tickets etc. against counterfeiting and falsification. The security devices further can also be applied as or incorporated into brand or product protection devices, or into means for packaging, like wrapping paper, packaging boxes, envelopes etc. Advantageously, the security device may take the form of a tag, security strip, label, fiber, thread, laminate or patch etc.

A merit function based on the height histogram may be helpful to characterize the pronounced surface relief plateaus. A possible merit function M is the following:

$$M = \frac{d}{\sqrt{(\Delta x_1)^2 + (\Delta x_2)^2}}$$

The merit function M uses a relation of peak widths and relief modulation depth. The range of deviations of the top and bottom regions around their plateau should lie within a certain defined fraction of the relief modulation depth. $\Delta x_1$ and $\Delta x_2$ are the width of the two histogram peaks as measured at the height 1/e of the full peak height, wherein e is the base of the natural logarithm (e≈2.72), and d is the distance of the two peaks (which corresponds to the average plateau to plateau distance or the relief modulation depth).

The surface relief microstructures used in the method of the invention preferably have a merit function M, which is greater than two. More preferably, M is greater than 3.5.

The invention claimed is:

1. An optical element (20, 29, 30, 40, 70, 79, 80, 90, 95) comprising areas with non-periodic, anisotropic surface relief microstructures, wherein a first (51, 27, 71, 83, 96, 91) and a second (61, 28, 72, 77, 84, 97, 92) image is at least partially encoded by the non-periodic, anisotropic surface relief microstructure (22, 26, 42, 43, 45, 46, 73, 74, 75, 76, 85, 86, 88, 89) such that when light is incident on a surface of the optical element that encompasses the areas with anisotropic surface relief microstructures, due to anisotropic scattering the first image is visible with maximum positive contrast under a first viewing angle, due to anisotropic scattering the second image is visible with maximum positive contrast under a second viewing angle, due to anisotropic scattering the first image is visible with maximum negative contrast under another viewing angle and due to anisotropic scattering the second image is visible with maximum negative contrast under a further viewing angle, wherein when the first image is optimally visible the second image is not or hardly visible and when the second image is optimally visible the first image is not or hardly visible, and wherein the non-periodic anisotropic surface relief microstructure encoding for at least part of an image comprises areas with a surface modulation of transitions from bottom regions to top regions and from top regions to bottom regions, wherein the surface relief aspect ratio, which is the average length to width ratio of the anisotropic surface relief pattern, is larger than 1.1.

2. The optical element according to claim 1, wherein the non-periodic, anisotropic surface relief microstructure related to the first image comprises areas which differ by the anisotropy direction.

3. The optical element according to claim 1, wherein there is a region related to the first image and a region related to the second image, both having a non-periodic, anisotropic surface relief microstructure, such that the anisotropy directions of said regions of first and second image differ by an angle between 22.5° and 67.5°.

4. The optical element according to claim 1, wherein the second image (28, 72, 77, 92, 97) comprises at least parts, which can be constructed as a geometric transformation of parts or of the whole of the first image.

5. The optical element according to claim 4, wherein the geometric transformation is one of or a combination of translation (28, 72, 77), mirroring (92), rotation (77), scaling (72, 97) or point inversion.

6. The optical element according to claim 1, wherein the first and second images overlap with each other at least partially (83, 84, 91, 92, 96, 97).

7. The optical element according to claim 1, wherein at least part of the first image in the area in which there is a non-periodic, anisotropic surface relief microstructure is split up in image units (81, 82).

8. The optical element according to claim 7, wherein the shape of the image units is quadratic, rectangular, trapezoid, triangular, hexagonal (81, 82) or circular.

9. The optical element according to claim 7, wherein at least part of the first and of the second image is split up in image units and the shape of the image units assigned to the information content of the first image is different from the shape of the image units assigned to the information content of the second image.

10. The optical element according to claim 7, wherein at least part of the first and of the second image is split up in image units and wherein in areas comprising image units of both images the total area of image units encoding the information content of the first and of the second image is different from each other.

11. The optical element according to claim 1, wherein at least for one of the images the non-periodic, anisotropic surface relief microstructure encodes for more than two grey levels by dithering the anisotropy direction.

12. The optical element according to claim 1, comprising a third or more images (98, 99), which are at least partially encoded by a pattern of the non-periodic, anisotropic surface relief microstructure and which are visible with maximum contrast under a third or additional viewing angles, respectively.

13. The optical element according to claim 1, wherein the second image (97) comprises at least parts, which can be constructed by scaling parts or the whole of the first image (96), such that by rotating or tilting the optical element the first and second images successively appear with monotonically increasing or decreasing size.

14. A method of using an optical element, comprising providing the optical element according to claim 1 for security applications.

15. A method for manufacturing an optical element with anisotropic surface relief microstructures on a surface, which has the property that when light is incident on said surface, due to anisotropic scattering a first image is visible with maximum positive contrast under a first viewing angle and due to anisotropic scattering a second image is visible with maximum positive contrast under a second viewing angle, wherein due to anisotropic scattering the first image is visible with maximum negative contrast under another viewing angle and due to anisotropic scattering the second image is visible with maximum negative contrast under a further viewing angle, wherein when the first image is optimally visible the second image is not or hardly visible and when the second image is optimally visible the first image is not or hardly visible, the method comprising:
  generating a pattern of a non-periodic, anisotropic surface relief microstructure on the element, such that the pattern comprises areas of different anisotropy directions of the microstructure and the pattern encoding information content of the second image has at least one area with an anisotropy direction which is not used in the pattern, which encodes information content of the first image,
  wherein the optical element which is manufactured is the optical element of claim 1.

16. The optical element according to claim 1, wherein the non-periodic, anisotropic surface relief microstructure related to the second image comprises areas which differ by the anisotropy direction.

17. The optical element according to claim 1, wherein at least part of the second image in the area in which there is a non-periodic, anisotropic surface relief microstructure is split up in image units (81, 82).

18. The optical element according to claim 1, wherein the second (97) and a third (98) image comprise at least parts, which can be constructed by scaling parts or the whole of the first image (96), such that by rotating or tilting the optical element the first, second and third images successively appear with monotonically increasing or decreasing size.

19. The optical element according to claim 1, wherein the non-periodic anisotropic surface relief microstructure encoding for at least part of an image comprises areas with a surface modulation of transitions from bottom regions to top regions and from top regions to bottom regions, wherein at least in one area the surface relief fill factor, which is defined as the ratio of the total area of top regions to the integrated area over all top and all bottom regions, lies in the range from 0.05 to 0.95.

20. An optical element (20, 29, 30, 40, 70, 79, 80, 90, 95) comprising areas with non-periodic, anisotropic surface relief microstructures, wherein a first (51, 27, 71, 83, 96, 91) and a second (61, 28, 72, 77, 84, 97, 92) image is at least partially encoded by the non-periodic, anisotropic surface relief microstructure (22, 26, 42, 43, 45, 46, 73, 74, 75, 76, 85, 86, 88, 89) such that when light is incident on a surface of the optical element that encompasses the areas with anisotropic surface relief microstructures, due to anisotropic scattering the first image is visible with maximum positive contrast under a first viewing angle, due to anisotropic scattering the second image is visible with maximum positive contrast under a second viewing angle, due to anisotropic scattering the first image is visible with maximum negative contrast under another viewing angle and due to anisotropic scattering the second image is visible with maximum negative contrast under a further viewing angle,
  wherein when the first image is optimally visible the second image is not or hardly visible and when the second image is optimally visible the first image is not or hardly visible, and
  wherein the non-periodic anisotropic surface relief microstructure encoding for at least part of an image comprises areas with a surface modulation of transitions from bottom regions to top regions and from top regions to bottom regions, wherein at least in one area the surface relief fill factor, which is defined as the ratio of the total area of top regions to the integrated area over all top and all bottom regions, lies in the range from 0.05 to 0.95.

21. A method for manufacturing an optical element with anisotropic surface relief microstructures on a surface, which has the property that when light is incident on said surface, due to anisotropic scattering a first image is visible with maximum positive contrast under a first viewing angle and due to anisotropic scattering a second image is visible with maximum positive contrast under a second viewing angle, wherein due to anisotropic scattering the first image is visible with maximum negative contrast under another viewing angle and due to anisotropic scattering the second image is visible with maximum negative contrast under a further viewing angle, wherein when the first image is optimally visible the second image is not or hardly visible and when the second image is optimally visible the first image is not or hardly visible, the method comprising:
  generating a pattern of a non-periodic, anisotropic surface relief microstructure on the element, such that the pattern comprises areas of different anisotropy directions of the microstructure and the pattern encoding information content of the second image has at least one area with an anisotropy direction which is not used in the pattern, which encodes information content of the first image,
  wherein the optical element which is manufactured is the optical element of claim 20.

* * * * *